United States Patent Office 3,734,977
Patented May 22, 1973

---

3,734,977
WATER-SOLUBLE CATIONIC THERMOSETTING ACRYLAMIDE-GRAFTED GLYOXALATED ALKYLAMINE-EPICHLOROHYDRIN WET STRENGTH RESIN AND PAPER CONTAINING THE SAME
Anthony Thomas Coscia, Norwalk, and Laurence Lyman Williams, Stamford, Conn., assignors to American Cyanamid Company, Stamford, Conn.
No Drawing. Continuation-in-part of applications Ser. No. 471,463, July 12, 1965, now abandoned, and Ser. No. 745,486, July 17, 1968, now Patent No. 3,556,932. This application Jan. 18, 1971, Ser. No. 107,458
Int. Cl. C08g 33/06
U.S. Cl. 260—874       5 Claims

ABSTRACT OF THE DISCLOSURE

Water-soluble lower alkylamine-epichlorohydrin polymers which have been grafted with at least ⅓ mol of acrylamide per polymer linkage and then glyoxalated are cationic thermosetting wet strength resins. Paper having a thermoset content thereof loses about half of its wet strength in 24 hours on normal wet weathering.

---

This is a continuation-in-part of our copending applications Ser. No. 745,486, filed on July 17, 1968, now U.S. Pat. No. 3,556,932, and No. 471,463 filed on July 12, 1965 and now abandoned.

The present invention relates to a new water-soluble cationic thermosetting grafted polyamine polymer carrying glyoxal substituents, to wet strength paper having a content of the polymer, and to processes for the manufacture of the polymer and the paper.

Our parent application discloses that the water-soluble ionic polymers which consist essentially of linear vinyl "backbone" chains carrying glyoxalated amide substituents are valuable agents in the manufacture of paper. The application discloses that when water-laid webs of cellulose fibers which have an adsorbed content of said polymers are dried at normal temperatures in the range of 190°–250° F., the polymer molecules react with the cellulose and that in addition the polymer molecules cross-link among themselves, so that the resulting paper possesses excellent wet strength.

An important property of the polymer and of wet strength paper containing the polymer is that much of the wet strength which the polymer imparts and which the paper possesses is temporary and disappears when the paper is subjected to normal weathering.

Permanent wet strength is often an unnecessary and indeed an undesirable property in paper. The time during which wet strength is needed in the working life of paper towels, napkins and "personal" tissues is rarely more than a few minutes, and a substantial part of the national litter problem results from the fact that discarded paper of these types remains intact for a long period of time when discarded out-of-doors. Moreover, broke which possesses permanent wet strength is difficult to rework; cf. U.S. Pats. Nos. 2,394,273; 2,423,097 and 2,972,313.

There is, therefore, a demand for paper which retains its wet strength during brief contact with moisture but which loses much of its strength after a short period of natural weathering. Our parent application provides paper of this character.

The present invention provides a new polymer which possesses substantially the same properties as the polymer of our parent application and which provides paper of similar temporary wet strength properties.

About half of the wet strength disappears after the paper has been soaked in water for 24 hours at room temperature. Articles composed of the paper of the present invention, when discarded, are quickly reduced to discrete fibrous state and do little harm to the ecology.

The polymer of the present invention is a water-soluble cationic alkylamine-epichlorohydrin polymer which has been grafted with acrylamide and then reacted with glyoxal so that it is thermosetting.

The polymer is strongly cationic and is, therefore, readily adsorbed by cellulose fibers in aqueous suspension. It imparts its wet-strengthening effect by reaction both with the cellulose of the papermaking fibers and by forming crosslinks with itself, and does both in the time the wet water-laid web is being dried in accordance with papermill practice on rolls having surface temperatures in the range of 190° F. to 250° F. It is effectively added to pulps having a pH value in the range of 4 to 8, and so permits the papermaking system to be run at a non-acid pH, with decreased harm to the paper-making machine and to the felt, and with production of paper that need not be subjected to acid tendering as it ages.

In typical instances, the polymer is composed of lower alkylamine-epichlorohydrin groups of the theoretical formula:

(I)
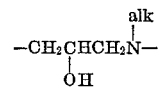

and amine-epichlorohydrin groups which have been graft polymerized with acrylamide and then reacted with sufficient glyoxal to introduce a sufficient number of glyoxal substituents to render the polymer thermosetting. The formulae of these linkages have not been determined, and the linkages may possess several different structures. For illustrative purposes and to simplify a preliminary understanding of the invention it will be hereinafter assumed that these linkages before glyoxalation have the theoretical formula:

(II)
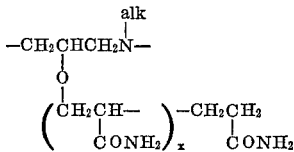

wherein $x$ represents an integer from one to 10,000 and alk represents a lower ($C_{1-3}$) alkyl substituent.

The glyoxal substituents have the formula:

(III)       —CHOHCHO so that after glyoxalation a typical grafted acrylamide unit has the theoretical formula:

(IV)
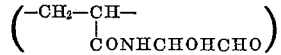

In Formulae I and II, the alkyl substituents may be propyl or isopropyl. However, since the alkyl substituent does not contribute to the wet-strengthening properties of the paper and in fact appears to act as a diluent. The smallest substituent (methyl) is preferred.

The polymer is thus essentially and typically a chain composed of alkylamine-epichlorohydrin residues, some of which carry grafted acrylamide chains which are partially or wholly glyoxalated.

The molecular weight of the parent alkylamine-epichlorohydrin component of the polymer is not critical, and polymers having a molecular weight below 1,000 and over 100,000 can be used. However, since storage-stability of the final glyoxalated polymers prepared from low molecular weight alkylamine-epichlorohydrin is generally longer, and since the viscosities of aqueous solutions of the final glyoxalated polymers are lower than the viscosities of corresponding polymers prepared from high molecular weight alkylamine-epichlorohydrin polymers, and since the wet-strengthening properties of the two polymers are about the same, we prefer to start with low molecular alkylamine-epichlorohydrin polymers rather than such polymers of high molecular weight. In practice, for these reasons we prefer alkylamine-epichlorohydrin polymers which have molecular weights in the range of about 1,000 to 10,000.

Alkylamine-epichlorohydrin polymers of any desired molecular weight can be prepared by the method of Coscia U.S. Pat. No. 3,493,502, the reaction being terminated at any desired molecular weight by addition of trimethylamine as chain-stopper.

The step of grafting acrylamide upon the alkylamine-epichlorohydrin polymer can be performed by the method of Mino et al. U.S. Pat. No. 2,922,768 using ceric ions as the catalyst. A large proportion of ceric ions produces a large proportion of grafts, and a low proportion of ceric ions produces a low proportion of grafts. The length of the grafted acrylamide chain is also a function of the concentration of acrylamide in the solution and the temperature, a comparatively small amount of catalyst and a large amount of acrylamide resulting in the formation of a few long chains. A large amount of catalyst and a small amount of acrylamide results in formation of comparatively many comparatively short chains. In practice, we prefer polymers wherein the grafted chains are long, i.e., containing more than 10 acrylamide units.

It is within the scope of the invention to employ polymers which carry acrylamide chains on substantially every backbone linkage. However, the preparation requires large amounts of ceric ion catalyst so that they are uneconomic. We have found that polymers of very satisfactory wet-strengthening properties are produced when only a few, e.g., between about 0.1% and 10% of the backbone linkages carry grafted acrylamide chains, and this extent of grafting is, therefore, preferred.

As a rule of thumb, the total number of acrylamide units in the grafted chain should be equal to at least about ⅓ of the alkylamine-epichlorohydrin linkages, as this proportion is about the least which is sufficient to form a polymer which after glyoxalation possesses practically useful wet-strengthening properties.

The molecular weight which the grafted alkylamine-epichlorohydrin polymer may have is limited by practical considerations. The molecular weight should be sufficiently low so that dilute solutions of the polymer (e.g. solutions of 1%–10% polymer solids content by weight) are of pumpable viscosity. Then, the molecular weight should be sufficiently low so that the polymer remains within the range of pumpability while undergoing normal storage. It appears that polymers having a molecular weight of 1,000,000 are satisfactory in both respects. Since, however, polymers of much lower molecular weight possess better pumpability and storage-stability characteristics, we prefer polymers having molecular weights prior to glyoxalation below about 50,000.

Glyoxalation of the grafted polymer is performed by heating a 10%–20% by weight aqueous solution of the polymer to about 30° C., adding the desired amount of glyoxal, and adjusting the pH to about 8–9. The glyoxal reaction is terminated after the reaction mixture has perceptibly increased in viscosity and before it had become an insoluble gel. Termination of the reaction is effected by diluting the reaction mixture to 5%–10% polymer solids, acidifying the solution and cooling the solution to room temperature.

The invention is further described by the examples which follow. These examples are best embodiments of the invention and are not to be construed in limitation thereof.

EXAMPLE 1

The following illustrates the preparation of a water-soluble cationic lower alkylamine-epichlorohydrin polymer containing comparatively long grafted acrylamide chains on a comparatively few sites, and the glyoxalation of a sufficient number of acrylamide units in the chains to render the polymer thermosetting.

To 100 g. (0.23 mol) of a 20% by weight solution (resin solids basis) of a methylamine-epichlorohydrin condensate having a molecular weight of about 100,000 is added 2 g. of sodium sulfate dissolved in 46 cc. of water adjusted to pH 4.8 with sulfuric acid, followed by 20 g. of acrylamide and 20 cc. of isopropyl alcohol. After the acrylamide has dissolved, 12 ml. of a 0.1 M ceric ammonium nitrate solution in 1 M nitric acid is added with vigorous stirring.

The temperature of the reaction mixture rises to 47° C. in five minutes and the mixture becomes much more viscous. The mixture is allowed to cool to room temperature, and the reaction goes to substantial completion.

To 20 g. of the solution is added 20 cc. of water and the pH is adjusted to 8 by addition of 2 g. of $$Na_2HPO_4 \cdot 7H_2O$$

and 1.8 g. (0.34 mol) of 20% aqueous sodium hydroxide solution, after which 2 g. of glyoxal is added as a 40% by weight aqueous solution. The resulting solution is heated at 35° C. for about 70 minutes and at 40° C. for about 20 minutes, until its Gardner-Holdt viscosity is I.

The solution is then diluted to 10% solids by addition of water, adjusted to pH 4, and cooled to room temperature. The product is an easily pumpable solution substantially composed of

and partially glyoxalated

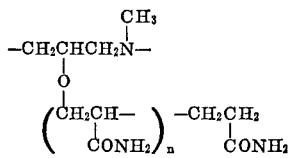

linkages, and is thermosetting.

A part of the solution is diluted to 1% solids and adjusted to pH 6. A sheet of filter paper dipped into this solution and dried at 100° C. possesses good wet strength.

EXAMPLE 2

The following illustrates the preparation of a polymer similar to that of Example 1 by a process wherein the number of epichlorohydrin residues which undergo the graft polymerization reaction are increased with a proportionate decrease in the length of the acrylamide chains.

The procedure of Example 1 is repeated, except that the amounts of all reagents except the methylamine-epichlorohydrin condensate and the isopropanol are multiplied by 10 and the acrylamide is added dropwise, as a 50% by weight aqueous solution with rapid stirring to the reaction mixture maintained at 50° C. The exotherm is controlled mainly by the addition of rate of the acrylamide.

EXAMPLE 3

The following illustrates the manufacture of wet strength paper according to the present invention.

To an aqueous suspension of a 50:50 mixture of bleached hardwood:bleached softwood fibers at 0.6% consistency is added 0.5%, based on the dry weight of the fibers, of the polymer of Example 1 as a 1% solution. The suspension is gently stirred and adjusted to pH 7.0. Handsheets are formed at a basis weight of 50 lb. per 25" x 40"/500 ream, the wet webs being dried for 1 minute on a rotary drum drier having a drum temperature of 235° F. The resulting paper has an initial wet strength of 3.3 lb./in. and has about half that strength after a 24 hour soak in water at room temperature.

EXAMPLE 4

The procedure of Example 3 is repeated except that the polymer of Example 2 is used in place of the polymer of Example 1.

The resulting paper has useful wet strength.

We claim:
1. A water-soluble cationic lower alkylamine-epichlorohydrin polymer carrying grafted acrylamide chains, the ratio of the number of said chains to the number of alkylamine-epichlorohydrin units of said polymer being at least 0.5 to 1, said acrylamide chains carrying a sufficient number of glyoxal substituents to render the polymer thermosetting.
2. A polymer according to claim 1 wherein the molecular weight of the alkylamine-epichlorohydrin polymer, exclusive of said acrylamide chains, is between 1,000 and 10,000.
3. A polymer according to claim 1 wherein the acrylamide chains are at least 10 acrylamide units long.
4. A polymer according to claim 1 wherein the number of said glyoxal substituents is between 0.1 and 0.5 of the number of acrylamide units in said chains.
5. A polymer according to claim 1 wherein the lower alkylamine-epichlorohydrin polymer is a methylamine-epichlorohydrin polymer.

References Cited
UNITED STATES PATENTS

| | | | |
|---|---|---|---|
| 3,567,659 | 3/1971 | Nagey | 260—874 X |
| 2,886,557 | 5/1959 | Talet | 260—72 |
| 3,372,086 | 3/1968 | Westfall et al. | 260—72 |

MURRAY TILLMAN, Primary Examiner

J. SEIBERT, Assistant Examiner

U.S. Cl. X.R.

162—166, 168; 260—29.4 UA

UNITED STATES PATENT OFFICE
CERTIFICATE OF CORRECTION

Patent No. 3,734,977     Dated May 22, 1973

Inventor(s) ANTHONY THOMAS COSCIA and LAURENCE LYMAN WILLIAMS

It is certified that error appears in the above-identified patent and that said Letters Patent are hereby corrected as shown below:

Col 4 lines 31-33. Change the formula from

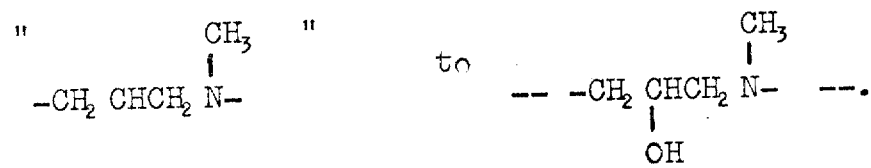

Signed and sealed this 25th day of December 1973.

(SEAL)
Attest:

EDWARD M. FLETCHER, JR.
Attesting Officer

RENE D. TEGTMEYER
Acting Commissioner of Patents